Patented June 18, 1935

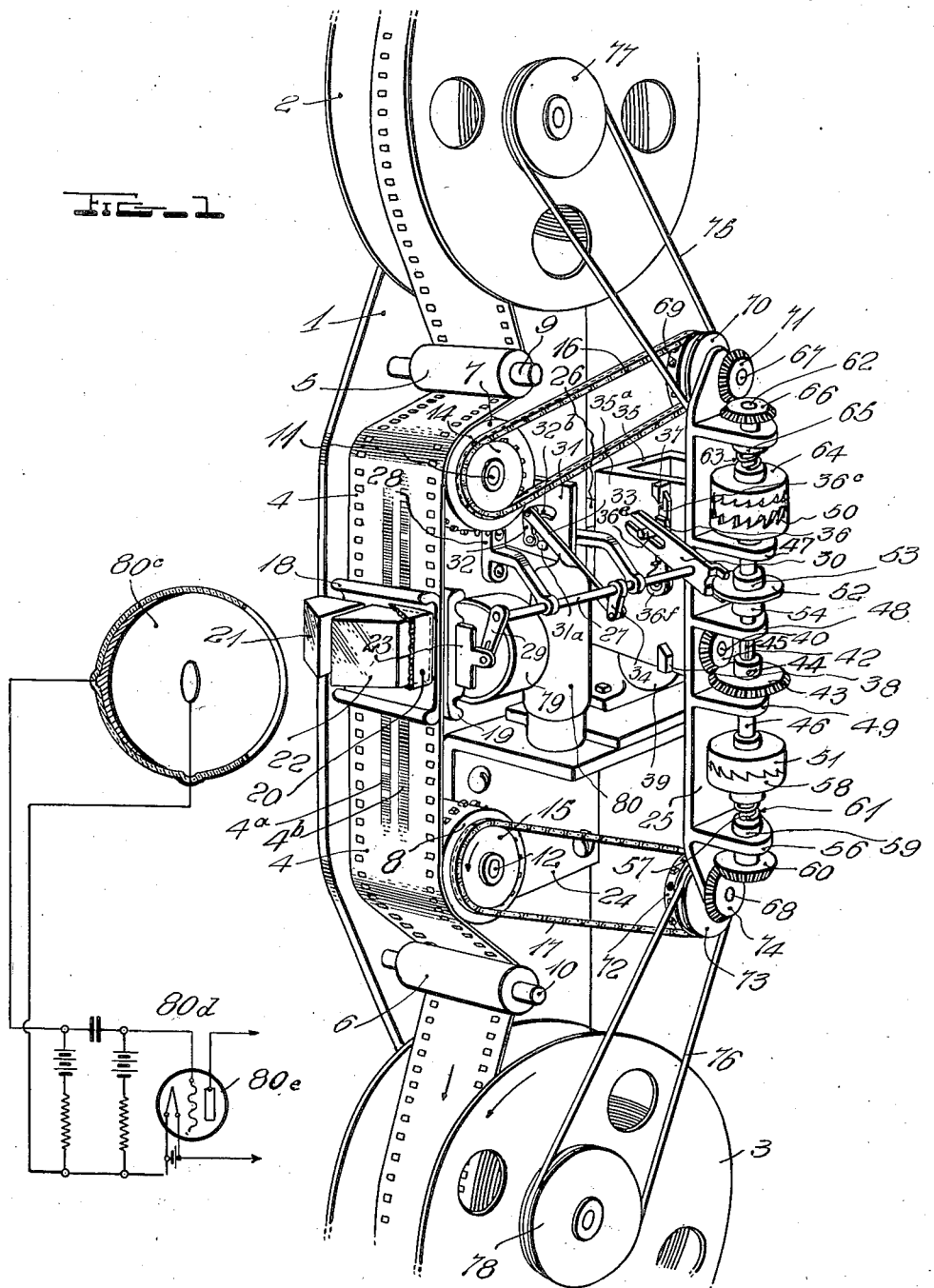

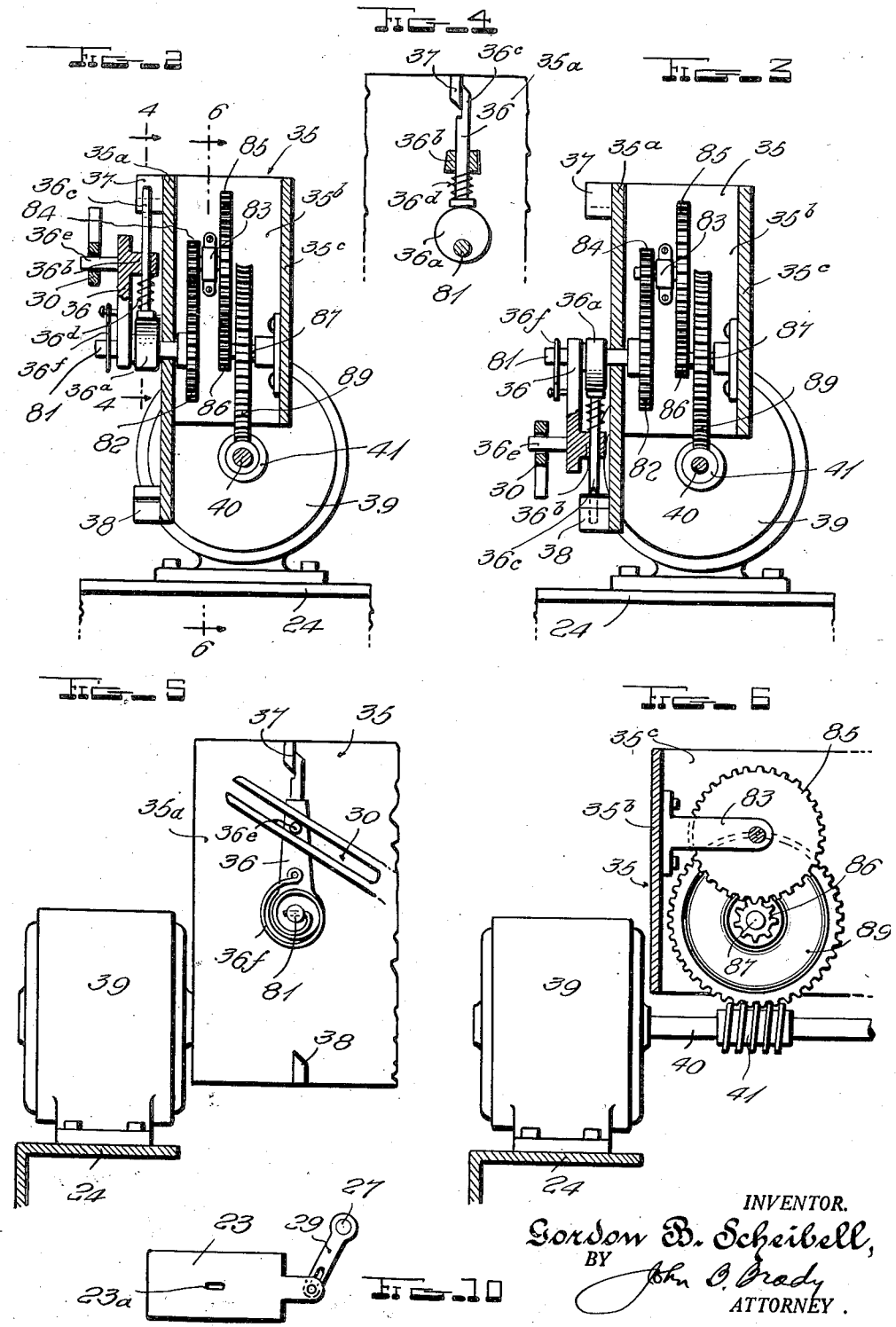

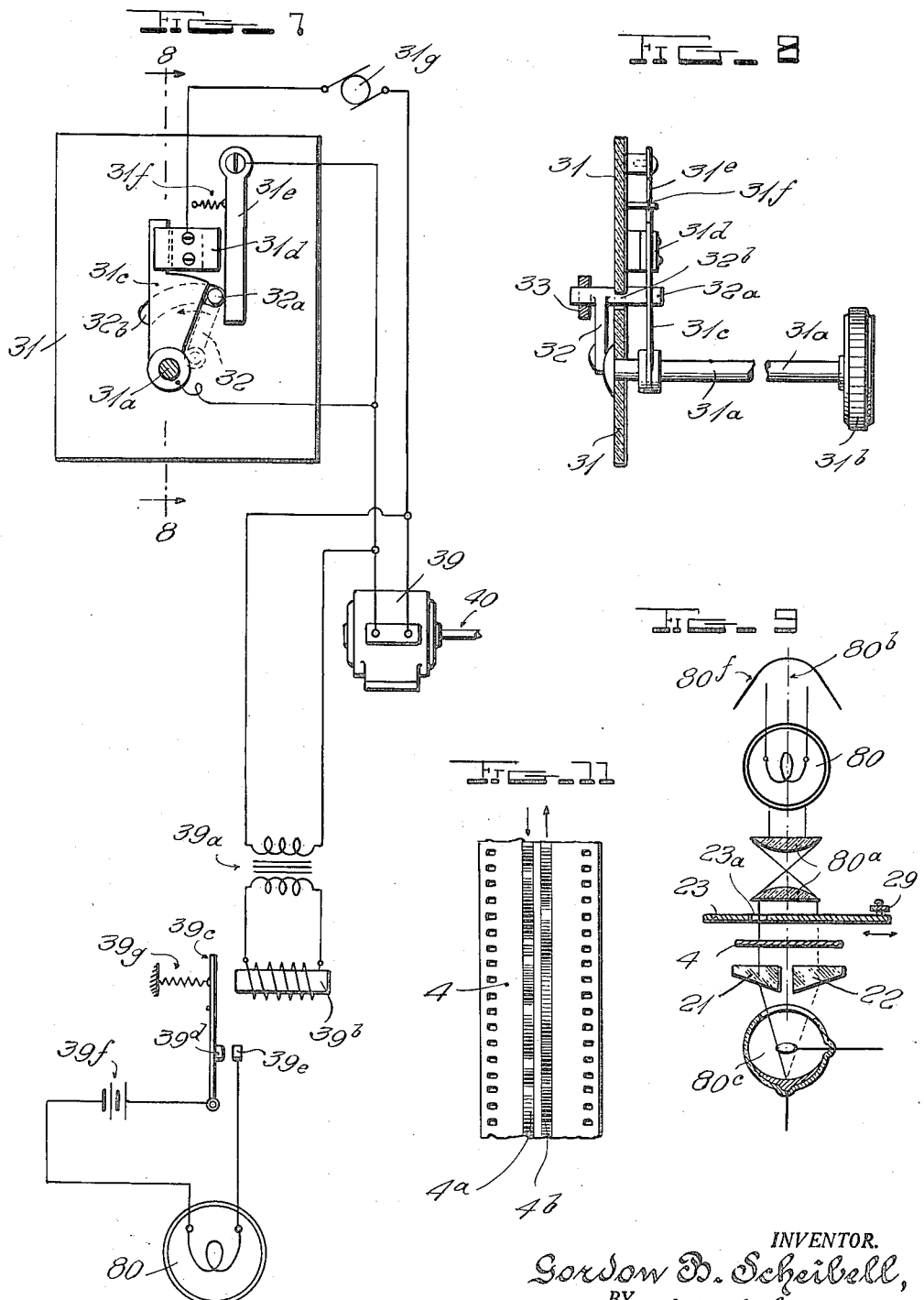

2,005,596

UNITED STATES PATENT OFFICE 2,005,596

SOUND REPRODUCTION PROJECTOR

Gordon Brown Scheibell, Newark, N. J.

Application April 11, 1930, Serial No. 443,398

31 Claims. (Cl. 179—100.3)

My invention relates broadly to sound reproducing systems and more particularly to an apparatus for reproducing sound from film records.

One of the objects of my invention is to provide an apparatus for the reproduction of sound wherein sound is recorded in multiple channels upon film and in which the film is automatically moved between a light source and a photoelectric cell for the reproduction of sound.

Another object of my invention is to provide a construction of automatic apparatus wherein a film record may be automatically threaded through a projection apparatus and the operation of the apparatus controlled for operating reeling mechanism, moving a light aperture into position with respect to a sound channel on the film, the apparatus being automatically reversible when the limit of movement of the film in one direction is reached in order that an adjacent channel on the film may form a continuation of the sound reproduced on the first mentioned channel.

Still another object of my invention is to provide a construction of automatic projector apparatus for sound records on film, wherein means are provided for automatically reversing the direction of movement of film through the projector apparatus when the limit of movement of the film is reached to form a continuous reproduction process with respect to a multiplicity of sound channels recorded on the film.

A further object of my invention is to provide an automatic mechanism for sound projecting apparatus for simultaneously controlling a plurality of different parts of a projecting apparatus and effecting a reversal in the direction of movement of the film at the limit of travel thereof in one direction for establishing a continuity of sound reproduction from sound records recorded in adjacent channels along the film.

Other and further objects of my invention reside in the arrangement of sound projector apparatus and control mechanism therefor as set forth more fully in the specification hereinafter following by reference to the accompanying drawings in which:

Figure 1 is a perspective view showing the several parts of the projector mechanism of my invention; Fig. 2 is a detailed view illustrating the arrangement of the reversing mechanism for the reeling apparatus in the sound projector; Fig. 3 illustrates a view of the reversing mechanism shifted 180 degrees from the position illustrated in Fig. 2; Fig. 4 shows the relation of the parts of the reversing and trip mechanism taken on line 4—4 of Fig. 2; Fig. 5 is a front elevation showing the connection between the reversing mechanism and the shiftable link in the reversing mechanism used in the sound projector of my invention; Fig. 6 is a view taken through the time control mechanism on line 6—6 of Fig. 2; Fig. 7 is a view of the switch control mechanism for initially starting the projector into operation showing the associated means for controlling the light source in the projector; Fig. 8 is a side view of the unicontrol mechanism for starting the several operating parts of the projector apparatus; Fig. 9 is a schematic view showing the relationship between the shiftable aperture and the lens system disposed with respect to the film record between the light source and the photo-electric cell; Fig. 10 is a plan view of the shiftable light aperture; and Fig. 11 shows a fragmentary portion of the sound record used in the sound reproducing system of my invention.

In the sound reproducing system which I have devised I employ a photo-electric cell which is acted upon by a variable light beam controlled by a sound record recorded upon a film. In systems heretofore employed in the reproduction of sound from film it has been usual to record a sound channel on the film adjacent the pictorial record on the film. When the film has been run through the projector it is necessary to resort to a rewinding process in order to restore the film to its initial condition ready for a rerun. It is highly desirable to use film of standard width, and I have conceived a practical form of automatic projector employing film of standard width wherein sound may be recorded in a multiple number of channels along the film either with or without a pictorial record thereon in a manner by which the film may be automatically reversed in its movement in one direction and rereeled through the projector in the opposite direction while maintaining the continuity of the sound recording process. I provide an automatic projector which is operated in one direction to reproduce sound recorded in one channel, and the apparatus automatically reversed to reel the film in an opposite direction for reproducing sound in a continuous manner from the adjacent sound channel. Coupled with the automatic reversing process, I provide automatic means for shifting the light beam from one sound channel to an adjacent sound channel, and also means for controlling the circuit to the light source, as will be more fully hereinafter described.

In Fig. 1 reference numeral 1 designates a frame. Adjacent the opposite extremities of the frame the reels 2 and 3, upon which the film 4 is wound, are journaled. Idler pulleys 5 and 6 are provided adjacent the reels 2 and 3. Reference characters 7 and 8 represent sprocket wheels which positively drive the film by engaging with the perforations provided in the same. The idler pulleys 5 and 6 and the sprocket wheels 7 and 8 are secured to the frame 1 by axial mountings 9 and 10 and 11 and 12, respectively, and are free to rotate thereon. Affixed to the sides of the principal sprocket wheels 7 and 8 are additional sprocket wheels 14 and 15 for engagement with driving chains 16 and 17. For the purpose of properly guiding the film I provide members 18 and 19 located between the sprocket wheels 7 and 8 and secured to the frame 1 between which the film 4 passes. The central portion of the member 18 is open to fit a lens box 20 into which are mounted two prisms 21 and 22. The member 19 has a longitudinal slot into which an aperture plate 23 slidably fits. At the back of the projector and secured to the frame 1 is a mounted bracket 24. A frame 25 is mounted parallel to the frame 1 on the bracket 24. A strengthening member 26 extends from the frame 1 to the frame 25 and is secured at opposite ends to both. A shift rod 27 extends from a bearing in the frame 25 through a bearing support 28 which is secured to the frame 1. At one end of the shift rod 27 is a coupling link 29 which couples the shift rod 27 to the aperture plate 23. At the other end of the shift rod 27 is a shift yoke 30. A switch panel 31 is mounted on the frame 1 and at right angles thereto. An arm 32 which is part of a switching arrangement mounted on the switch panel 31, which is more-fully described hereinafter, is connected by a coupling link 33 to another arm 34 which is secured to the shift rod 27. A box 35 which contains a timing element, more fully described later, is mounted on the back of the frame 25. On the side of the box 35 adjacent to the shift rod 27 is an arm 36, also more fully described hereinafter, which revolves in a plane parallel to the surface of the box 35 upon which it is mounted. Two stops 37 and 38 are secured to the box 35 and located so that they intercept the path of the arm 36 every 180 degrees. A driving motor 39 is mounted upon the bracket 24. The shaft 40 of the motor extends through the frame 25. Centrally located thereon is a worm 41 which engages a gear of the timing element of the box 35 described hereinafter. At the end of the shaft 40 is a bevel gear 42 which engages another bevel gear 43. The gear 43 has a pin 44 extending through its hub into a slot 45 in the drive shaft 46. The drive shaft 46 is supported by bearing members 47, 48 and 49 which are secured to the frame 25. At one end of the shaft 46 and above the bearing member 47 is secured the driving member 50 of a clutch, while at the other end of the shaft 46 below the bearing member 49 is secured the driving member 51 of another clutch. A shift disc 52 is located between two thrust collars 53 and 54 which are secured to the shaft 46. The disc 52 engages with one end of the shift yoke 30. A shaft 57 is mounted in bearing member 56. Secured to this shaft are the driven members 58 of a clutch, a thrust collar 59 and a miter gear 60. The member 58 is prevented from moving up or down on the shaft 57 by an annular shoulder but is free to rotate. A spring 61 coiled around the shaft 57 has one end secured to the thrust collar 59 and the other end secured to the driven member 58 of the clutch. Hence, shock from sudden engagement of the member 58 will be absorbed by this spring. A similar construction will be seen in shaft 62, driven member 64 of a clutch, spring 63, thrust collar 65 and miter gear 66. Shafts 67 and 68 are provided at either end of the frame 25 upon which are mounted, as shown, sprocket wheels 69 and 72, pulley wheels 70 and 73, and miter gears 71 and 74, respectively. The sprocket wheels 69 and 72 engage the driving chains 16 and 17 and positively drive the sprocket wheels 14 and 15. The pulley wheels 70 and 73 engage belts 75 and 76 which in turn engage other pulley wheels 77 and 78 which are secured to the reels 2 and 3. The belts 75 and 76 are preferably of a metallic weave or wound wire which will slip on the pulleys 77 and 78. The pulleys 70 and 73 are of a size such that they will cause the belts 75 and 76 to always drive the pulleys 77 and 78 at the maximum speed required to reel up the film fed by the sprockets 7 and 8.

The sprockets 7 and 8 maintain a continuous and even rate of speed for the film 4, but as the film is reeled and unreeled on the reels 2 and 3, the diameters upon which the film 4 is wound will vary and increase or decrease according to the amount of film on the reels. The belts 75 and 76 which slip upon the pulleys 77 and 78 act as a slip-clutch and compensate for this change in diameter.

Mounted directly behind the member 19 and secured to the frame 1 is a lens box 79. This lens box is part of the optical system which I will fully describe later. In line with the lens box 79 and mounted on the bracket 24 is an exciting lamp 80 suitable for use in conjunction with the photo-electric cell.

In Fig. 1 a photo-electric cell 80c is shown in its relative position with reference to the structure of the reel mechanism. A portion of the photo-electric cell circuit is schematically illustrated at 80d including an amplifier tube 80e leading to the sound reproducing circuit.

Fig. 11 shows a typical portion of the film for use with the projector of my invention. As shown this film has a multiplicity of parallel channels of sound recordings at 4a and 4b, the arrows indicating direction of recording. It will be seen that one channel is reproduced in one direction and that the other channel is reproduced in the opposite direction.

Fig. 2 is a detail view of the interior of the box 35 containing the timing element in the form of an intermittent motion mechanism driven by the motor 39 for effecting the periodic reversal of the film 4 and the transverse shift of the shutter or aperture plate 23. The shaft 81 is journaled in one side 35a of the box 35. Mounted on this shaft 81 is the arm 36 as shown in Figs. 2 and 3. Mounted upon the same shaft but upon the other side 35a of box 35 is a spur gear 82. A bearing 83 is secured to the side 35b of the box 35. Mounted in this bearing is a shaft upon which is secured a large spur gear 85, and also a small spur gear 84 which meshes with the large spur gear 82. This large spur gear 85 meshes with another spur gear 86, which is in turn secured to a shaft 87 mounted in the wall 35c of the box 35. Secured to this shaft 87 is a large worm wheel 89 which meshes with the worm 41 described elsewhere. This worm 41 is mounted upon the shaft 40 which is driven by the motor 39. It will be seen that this gear train appreciably reduces the number of revolutions per minute transmitted from the driving shaft 40 and delivered to the shaft 81. This train of reduction gears is to be so timed that there will be a 180 degree revolution of the shaft 81 every time a complete length of film has passed by the aperture plate 23 in one direction. This timing element determines the length of a sound channel recorded upon the film 4, and all such recordings have a length specifically for use in machines of my design.

The shaft 81 extends through one end of the arm 36. A cam 36a is eccentrically mounted on the shaft 81 and is rotated in a plane parallel with the arm 36 as shown in Fig. 4. A sliding bearing 36b is mounted upon the outer end of the arm 36. Slidably positioned in this bearing 36b is a pawl 36c. One end of this pawl 36c is notched in the manner shown to engage with the stops 37 and 38. The other end of this pawl is shouldered to form a bearing which rides upon the cam 36a. Mounted upon the pawl 36c and between the shoulder thereon and the bearing 36b is a spring 36d. This spring exerts pressure against the shoulder of the pawl and forces it continuously in contact with the periphery of the cam 36a. It will be seen that a revolution of the shaft 81 will cause the pawl 36c to move up and down with reference to the center of the shaft 81. Mounted upon the reverse side of the arm 36 is a pin 36e which engages in a slot in the shift yoke 30. The spiral spring 36f is coiled about the end of the shaft 81 which projects through the arm 36. This spring is secured at one end to the arm 36 and at the other end to the shaft 81. The spring is so shaped and positioned that there is a continual pressure transmitted from the shaft to the arm 36 in the direction of rotation. Rotation of the shaft 81 tends to increase this spring pressure. The purpose of the mechanical elements of this arm 36 is to provide a very quick motion of the arm 36 at a predetermined point of rotation of the reduction gear train.

Figs. 7 and 8 represent a switch for starting and stopping the driving motor of the projector. The panel 31 of insulating material has mounted thereon a shaft 31a to which is attached an insulating knob 31b. A contacting sector 31c is secured to the shaft 31a and positioned so that it will engage with the double contact 31d secured to the panel. A contacting knife 31e is pivotally secured to the panel 31 and positioned so that it will engage with the other side of the contact 31d. A spring 31f is provided between the panel and the contacting knife 31e for normally holding the knife 31e in engagement with the contact 31d. An arm 32, which is shown in Fig. 1, is also mounted upon the panel 31. Mounted upon the free end of this arm 32 is a projection 32a which extends through an arcuate slot 32b in panel 31 and engages with the contacting sector 31c and contacting knife 31e in the manner indicated. The aperture 32b is cut on a radius of the center of the arm 32 and in the shape shown. Connected to the arm 32 as shown in Fig. 8 there is a section of the coupling link 33 as shown in Fig. 1. It will be seen that movement of the arm 32 in the direction indicated by the arrow in Fig. 7 will cause the contacting sector 31c to disengage with the contact 31d, and the contacting knife 31e to engage with the same. Motion in the opposite direction will cause a reverse procedure. An electrical energy source 31g is provided for driving the motor 39. Connected across the line to the source 31g are the contacting sector 31c and contacting knife 31e. As shown in Fig. 7, after initially closing the contacting sector 31c manually by means of the knob 31b, the motor will be running. Also connected across the power line to the motor is a transformer 39a which supplies current for a magnet 39b. This magnet 39b actuates an armature 39c carrying contact 39d which engages with another contact 39e. Contacts 39d and 39e in engagement close a circuit from a suitable electric source 39f to the filament of the exciting lamp 80. The armature 39c is held away from the magnet 39b by means of a spring 39g.

Movement of the arm 32 causes the projection 32a to disengage the contacting sector 31c. But before the contacting sector 31c is brought out of engagement with the contact 31d, the contacting knife 31e engages with the contact 31d by means of tension of the spring 31f. Return of the projection 32a on the arm 32 will force the contacting knife 31e away from engagement with the contact 31d. The contacting sector 31c, however, has not been made to return to engagement with the contact 31d, and consequently the circuit will be broken and the motor 39 shut down.

It will be seen that by manually, or under electrical control, closing the contacting sector 31c with respect to contact 31d the projector is initiated into operation.

Fig. 10 shows the aperture plate 23 containing aperture 23a coupled by means of the coupling link 29 to the shift rod 27. The aperture 23a in the plate 23 is of a nature best suited for admitting a proper light beam to the film. Further, it is of such a size and position that it will admit a light beam to but one channel of the sound record on the film.

Fig. 9 is a schematic representation of the lens system used in this projector. The exciting lamp 80, the condensing lenses 80a, the aperture plate 23, the film 4, the prisms 21 and 22, and the photo-electric cell 80c, are symmetrically located about an axis 80b shown in Fig. 11. Parallel light rays from the exciting lamp 80 are intercepted by the aperture plate 23 and passed through the aperture 23a. A parabolic reflector 80f is located behind the lamp 80 for directing the light rays toward the film 4. The aperture 23a admits a suitable beam of light to the film 4 and subsequently to one of the prisms 22 or 21, which in turn bends the beam to focus upon the sensitive portion of the photo-electric cell 80c. It will be seen that the aperture plate 23 will admit a beam of light from the exciting lamp 80, first to one sound channel 4a on the film and then, when shifted, to the other sound channel 4b, and the light beam upon coming from either side of the film will be focused upon the photo-electric cell 80c. An advantage of such an arrangement is that the exciting lamp is symmetrically located with reference to the photo-electric cell 80c, and will give uniform intensity for both channels of sound recording 4a and 4b, with subsequent uniformity of reproduction.

Before the projector is started, the reel 2 will contain all of the film 4 except that portion which is used for threading through the projector up to reel 3 between plates 18 and 19. There is no sound record upon this threading up portion. The rest of the mechanical elements will be in a position as indicated in Fig. 1. When the operator desires to start the projector he will close the contacting sector 31c by means of the knob 31b shown in Fig. 9 or under remote electrical control by a solenoid switch. This will start the motor 39, which through the clutch 51 and 58 and intermediate mechanical elements will drive the sprocket 8 and reel 3, winding the film from reel 2 through members 18 and 19 past the lens system. At the same time the exciting lamp circuit will be closed by means of the magnet 39b, as in Fig. 7. All sound films in my system are of uniform length, and all sound recordings thereon begin and end at definite locations on the film.

Referring back to Fig. 2 as the film is run through the projector, the train of reduction gears in the timing element in box 35, revolve the shaft 81. At the exact moment when the end of the sound channel on the film is proximate to the path of the light beam from the exciting lamp, the shaft 81 will have revolved 180 degrees by means of the train of reduction gears and caused the cam 36a to release the pawl 36c from engagement with the stop 37. The arm 36 will then very quickly revolve 180 degrees in the direction of rotation of the shaft 81 by means of pressure of the spring 36f. The projection 36e on arm 36 which engages the shift yoke 30 will cause the same to partially rotate the shift rod 27 and shift the shift disk 52, which in turn disengages clutch 51—58 and engages clutch 59—64, thereby abruptly reversing the direction of travel of the film 4. Simultaneously, the movement of the shift rod 27 will move the aperture plate 23 so that the aperture 23a admits a light beam from the exciting lamp to the other sound channel 4b, which has not yet been reproduced. Further, at the same time, the coupling link 33 will cause the arm 32 mounted on the panel 31, as shown in Fig. 1, to disengage the manually operated contact segment 31c and allow the contacting knife 31e to engage with the contact 31d, thereby continuing the electrical circuit from source 31g to the motor 39. The film will then be driven from reel 3 and wound on reel 2 by means of the sprocket 7 and reel 2, which are now being driven from the shaft 67. When the end of the present channel 4b, which was the beginning of the first channel 4a, is proximate to the path of the light beam the arm 36 will again quickly revolve 180 degrees.

This last movement of the arm 36 will disengage the clutch 59—64, engage the clutch 51—58, shift the aperture plate 23 so that the aperture 23a admits a beam of light to the first sound channel 4a, and move the coupling link 33 so that the arm 32 and projection 32a return to the position shown in Fig. 1 and disengage the contacting knife 31e from contact 31d. The electrical circuit to the motor 39 will be broken, as the contacting sector 31c is not now in engagement with contact 31d, and the transformer 39a will cease to supply current to the magnet 39b, and the armature 39c will break the filament circuit of the exciting lamp. The mechanical elements of the projector will be in an initial starting position as first described and this film, or a substitute film, is ready to be run off again.

Certain of the operating arrangements and parts of the apparatus disclosed but not claimed are covered in copending applications Serial Numbers 2133, 2134, and 2135, filed January 16, 1935, and Serial Numbers 16955 and 16956, filed April 18, 1935.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. In a sound reproducing apparatus, a reversible reel mechanism carrying a film, said film having sound recorded thereon in adjacent channels with the sound record in one channel extending in one direction and the sound record in the adjacent channel extending in the opposite direction, a light source disposed on one side of said film, a photo-electric cell on the opposite side of said film, a pair of prism members independently aligned with said sound records, a light aperture for directing light rays from said light source through one or the other of said prisms and incident upon said photoelectric cell in accordance with the sound channel being reproduced, and means controlled at the limit of travel of said film in one direction for shifting said light aperture from a position registering with one of said sound channels in alignment with one of said prisms and to a position registering with the other of said sound channels in alignment with the other of said prisms.

2. In a sound reproducing apparatus, a reversible reel mechanism carrying a film having sound recorded thereon in separate channels extending adjacent each other, with the sound record in one channel extending in a direction opposite to the direction of the sound record in the adjacent channel, a light source disposed on one side of said film, a photoelectric cell disposed on the opposite side of said film, a pair of prism members disposed adjacent said film, one of said prism members being aligned with one of the sound channels and the other prism member being aligned with the other sound channel, a light aperture shiftable to direct a beam of light from said light source through either of said sound channels and incident upon said photoelectric cell, and means controlled at the movement of said film to a predetermined limit for rendering said light source effective upon said sound channels in succession.

3. In a sound reproducing system a photoelectric cell, a reversible reel mechanism carrying a film having sound recorded thereon in a plurality of different longitudinally extending channels, a multiplicity of prisms positioned adjacent said film and aligned with said photoelectric cell, a light source adjacent said film on the side thereof opposite to said photoelectric cell, a light aperture for directing a beam of light from said light source through a particular sound channel on said film and through one of said prisms and upon said photoelectric cell, and means operative in accordance with the limit of movement of said film for shifting said light aperture to a position exposing the adjacent sound channel to said light source for directing a beam of light through another prism and upon said photoelectric cell for effecting continuous exposure of the sound channels on said film to the effect of light rays from said light source.

4. In a sound reproducing system, a photoelectric cell, a reproducing circuit connected thereto, a reversible reel mechanism, a film carried by said reel mechanism, a light source adjacent said film, means for moving said film between said light source and said photoelectric cell in one direction, a timing device adapted to operate independently of any control directly exercised by said film but at the limit of movement of said film in one direction for reversing the movement of said reel mechanism and causing the film to be driven in the opposite direction, separate sound channels on said film, one of said sound channels extending in one direction and another of said sound channels extending in the opposite direction, and means controlled by said timing device at the reversal of movement of said film for cutting off the light source from one of said sound channels and exposing the other of said sound channels to the effect of said light source for correspondingly controlling said photoelectric cell.

5. In a sound reproducing system, a reversible reel mechanism carrying a film having a pair of separate sound channels thereon, one of said sound channels extending in one direction along said film and the other of said sound channels extending in the opposite direction along said sound channel, a pair of prism plates located adjacent the respective sound channels, a photoelectric cell adjacent said prism plates, a source of light positioned behind said film and aligned with said photoelectric cell, and means for successively exposing the sound channels on said film to the effect of said light source depending upon the direction of movement of said film.

6. In a film apparatus, a film, a stationary refractive optical means, means adapted to move said film in either of two longitudinal directions, means movable with respect to said optical means and adapted to selectively expose adjacent longitudinal portions of said film to said optical means, and an intermittent motion mechanism adapted to automatically reverse the direction of movement of said film in timed relation to a predetermined length of movement of said film in either of said two directions, but independently of any control exercised by said film.

7. In film apparatus, a film, a motor, reel mechanism driven by said motor and adapted to move said film in either of two longitudinal directions, an intermittent motion mechanism adapted to periodically reverse the direction of movement of said film and operable independently of any control by said film, refractive optical means, a shutter adapted to expose longitudinal portions of said film to said optical means, shifting mechanism controlled by said mechanism and adapted to periodically shift said shutter with respect thereto to expose different longitudinal portions of said film to said optical system.

8. In a film apparatus, a film, a motor, means driven by said motor adapted to move said film in either of two opposite directions, clutch reversing means adapted to reverse the direction of movement of said film, refractive optical means, a shutter adapted to expose a portion of said film to said optical means, shifting mechanism adapted to move said shutter transversely with respect to said film, and an intermittent motion mechanism adapted to periodically actuate said clutch reversing means and said shifting mechanism independently of any control exercised by said film.

9. In a film apparatus, a film, a photoelectric cell having a photosensitive cathode, motor driven means adapted to move said film in either of two longitudinal directions, and an optical system comprising, a light source adapted to direct light rays towards said film, movable aperture means operated by said motor for controlling said light rays to selectively project light beams on two different transverse portions of said film, and refractive means adapted to direct either of said beams of light on the same area of said photo sensitive cathode.

10. In a film apparatus, a film, motor driven means adapted to move said film in either of two longitudinal directions, a photo sensitive device, a light source adapted to direct a multiplicity of light rays towards said film, aperture means operated by said motor driven means and adapted to selectively define at least two different light beams of substantially equal intensities, and prisms adapted to direct said groups of light rays upon the same localized area of said photo sensitive device.

11. A film apparatus comprising, a photo sensitive cell, a light source adapted to direct light rays upon said cell, a film interposed between said light source and said photo sensitive cell, means adapted to move said film in either of two longitudinal directions, a timing device operated independently of any direct control exercised by said film and adapted to periodically alternate the direction of movement of said film, and a shutter adapted to direct said light rays through different longitudinal portions of said film, said shutter and said film being transversely moved with respect to each other at periodic intervals by said timing device.

12. A film apparatus comprising, a film, automatic means for sequentially moving said film in different directions, a plurality of prisms aligned with different longitudinal portions of said film, and means operated in synchronism with said automatic means for selectively directing light through said prisms.

13. Film apparatus comprising a photosensitive film, a photosensitive cell, an amplifier circuit connected thereto, a source of light, a motor, means driven by said motor for moving said film between said photosensitive cell and said source of light, aperture means for successively exposing adjacent longitudinal portions of said film to permit light to pass therethrough from said light source to said photosensitive cell, and a timing mechanism including reduction gears adapted to be continuously driven by said motor for causing the automatic movement of said aperture means and said film transversely with respect to each other in accordance with predetermined amounts of movement of said film between said light source and said photosensitive cell.

14. In a sound reproducer comprising means for reproducing sound from a selected one of a plurality of film recorded sound tracks, motor driven film moving mechanism, photosensitive means, a sound reproducing and amplifying circuit connected with said photosensitive means, movable means for directing light to said photosensitive means through a selected one of said sound tracks, and a motor driven intermittent motion mechanism for automatically causing the operation of said movable means at a predetermined time with respect to the longitudinal movement of said selected sound track whereby light is directed to said photosensitive means through a different sound track for reproduction of sound therefrom, said intermittent motion mechanism operating independently of any control exercised by said film.

15. The combination in accordance with claim 14 in which said intermittent motion mechanism includes reduction gears driven by said motor in synchronism with said film mechanism, and a quick acting device adapted to be periodically operated thereby.

16. A film apparatus comprising means for supporting and reversably feeding a film, and means mechanically operable independently of any control directly exercised by said film for directing light to a restricted longitudinal portion of said film while said film is fed in one direction and for cutting off the light from said longitudinal portion of said film and directing light to another longitudinal portion of said film while said film is fed in a reverse direction.

17. Film apparatus comprising, a film, rotary driving means, film feeding mechanism effectively driven by said rotary driving means and including a pair of reels for moving said film in different longitudinal directions between said reels, an optical system for directing light with respect to different longitudinal portions of said film depending upon its longitudinal direction of movement, said optical system including stationary refractive means and a reciprocatively movable shutter, and means adapted to be continuously driven by said rotary driving means during the movement of said feeding mechanism for moving said shutter in timed relationship with the longitudinal movement of said film in either direction between said reels, said means including a train of reduction gears coupled with said rotary driving means and an eccentric system coupled with said train of gears for translating rotary motion into reciprocative motion.

18. Film apparatus comprising, a supporting structure, rotary driving means carried by said supporting structure, a film, an optical system for directing light with reference to a restricted longitudinal portion of said film and including refractive means mounted stationary in said supporting structure and a shutter mounted for reciprocative movement, mechanism effectively driven by said rotary driving means and including a pair of reels for positively feeding said film in different longitudinal directions between said reels in a process of exposing different longitudinal portions of said film to the effect of light directed through said optical system, a train of reduction gears driven by said rotary driving means, a rotatable element driven by said gears, means including a member eccentrically coupled with said rotatable element for imparting reciprocative motion to said shutter in timed relationship with the longitudinal movement of said film, means including a rotatable shaft effectively driven by said rotary driving means, said shaft and said reels being relatively movable in a sense other than rotation for enabling said shaft to impart rotary motion to said reels one at a time thereby effecting the alternate use of said reels in a film take-up operation when said film is fed in different directions between said reels.

19. Film apparatus comprising, a supporting structure, a film, an optical system for directing light with reference to a restricted longitudinal portion of said film and including refractive means mounted stationary in said supporting structure and a shutter mounted for reciprocative movement, mechanism effectively driven by said rotary driving means and including a pair of reels for positively feeding said film in different longitudinal directions between said reels in a process of exposing different longitudinal portions of said film to the effect of light directed through said optical system, a train of reduction gears driven by said rotatable driving means, a rotatable device driven by said gears, means including a member eccentrically coupled with said rotatable device for imparting reciprocative motion to said shutter, a stopping device including a cam driven with said rotatable member and an element peripherally engaging said cam under tension of a spring for stopping said cam in a predetermined angular position to bring said shutter to rest in a predetermined position with respect to said film, means including a rotatable shaft effectively driven by said rotary driving means, said shaft and said reels being relatively movable in a sense other than rotation for enabling said shaft to impart rotary motion to said reels one at a time thereby effecting the alternate use of said reels in a film take-up operation when said film is fed in different directions between said reels.

20. Film apparatus comprising, a supporting structure, rotary driving means carried by said supporting structure, a perforated film, an optical system for directing light with reference to a restricted longitudinal portion of said film and including refractive means mounted stationary in said supporting structure and a shutter mounted for reciprocative movement, mechanism effectively driven by said rotary driving means and including a pair of reels and sprocket means for positively feeding said film in different longitudinal directions between said reels in a process of exposing different longitudinal portions of said film to the effect of light directed through said optical system, reduction gears driven by said rotary driving means, means driven by said gears at a reduced speed and comprising a cam and a rotatable element mounted upon the same shaft, a pin eccentrically carried by said rotatable element, a pivotally acting lever having a slot therein engaging said pin, a rod connecting said lever with said shutter for imparting reciprocative motion thereto from said lever when actuated by said eccentrically carried pin, a rectilinearly movable member peripherally engaging said cam, said member being movable between the periphery of said cam and parts of said mounting structure for arresting the movement of said cam to bring said shutter to rest in a predetermined position with respect to said film, a spring for urging said rectilinear member into peripheral engagement with said cam for controlling the movement thereof, and rotatable means including a shaft effectively driven by said rotary driving means, said shaft and said reels being relatively movable in a sense other than rotation for enabling said shaft to impart rotary motion to said reels one at a time for effecting the alternate use of said reels in a film take-up operation when said film is fed in different directions between said reels.

21. Film apparatus comprising, photosensitive means, a circuit connected with said photosensitive means, a film, means for directing light through said film to said photosensitive means including refractive means, shutter means for exposing different longitudinal portions of said film, and an electrical source of light having a circuit connected therewith; rotary driving means, reel mechanism driven by said rotary driving means for reversibly feeding said film, a manually settable element for initiating the operation of said rotary driving means and said light source, and means adapted to operate independently of any control directly exercised by said film but in accordance with predetermined movement of said film for interdependently controlling said light source circuit, said shutter, said manually settable member and the effective operation of said rotary driving means in moving said film mechanism, whereby said film apparatus as a whole, after the initiation of operation by said manually settable element, is automatically operated in a process of reversibly feeding said film and directing light through different longitudinal portions thereof to said photosensitive means and brought to rest after the completion of a cycle of operations in said process.

22. Film apparatus comprising, a film, movable means for effectively directing light to different longitudinal portions of said film, feeding means for feeding said film in different longitudinal directions, a motor for driving said feeding means, and means comprising mechanism effectively operable at the limit of movement of said film in one longitudinal direction for causing said film to be fed in the opposite direction and for transmitting mechanical forces from said motor to said movable means for moving the same to cause light to be effectively directed to a transversely different longitudinal portion of said film when said film is fed in the opposite direction.

23. Film apparatus in accordance with claim 22 in which said mechanism includes a reciprocative controlling member movable into two different positions, one of which causes said film to be driven in one direction and controls said movable means for directing light to one longitudinal portion of said film and the other position of which causes said film to be moved in the opposite direction and controls said movable means for directing light to a different longitudinal portion of said film, and resilient means for urging said reciprocative member to either one of said positions selectively in accordance with the predetermined movement of said film.

24. Film apparatus comprising, a film, movable means for effectively directing light to transversely different longitudinal portions of said film, feeding means for feeding said film in different longitudinal directions, an electric motor for driving said feeding means, a circuit for controlling said motor including a switch movable between two different positions and operable from one position to another each time the direction of movement of said film is reversed, film feeding reversing means including a reciprocative device movable into one position when said film is fed in one direction and into another position when said film is fed in a reverse direction for correspondingly actuating said switch in different positions, and means for delivering mechanical forces from said motor to said reciprocative device for actuating said switch, said means being operable at the limit of movement of said film in moving in said longitudinal directions.

25. Film apparatus in accordance with claim 24 in which said reciprocative device is mechanically coupled with said movable means for shifting the same when said film is reversed.

26. Film apparatus in accordance with claim 24 including means for bending the direction of light from an electrical light source and in which said reciprocative device is mechanically coupled with said movable means for shifting the same when said film is reversed, said reciprocative device including quick-acting resilient means for urging said device to either of two said positions.

27. Film apparatus comprising, a pair of reels, a perforated film carried by said reels and having photographic records thereon disposed upon transversely different longitudinal portions of said film and extending in opposite directions on said film, an optical system for directing light with reference to said longitudinal portions of said film and including, an electrical source of light, movable aperture means, and optical means for bending the light rays from said light source to change its direction; an electric motor, perforation engaging means driven by said motor for positively feeding said film, an electrical circuit for controlling said motor including a switch operable between two different positions, and reversing means including a reciprocative member effectively mechanically actuated by said motor for moving said switch from one position to another, said reversing means being operable at the limit of movement of said film in one direction for causing said film to move in the opposite direction for selectively directing light with reference to the different photographic records on said film.

28. Film apparatus in accordance with claim 27 in which said optical means comprises prism means mounted stationary with respect to said movable aperture means.

29. Film apparatus for reversibly feeding a film comprising, a perforated film, first and second reels upon which said film is stored and between which said film is reversibly fed, intermediate mounting means including two intermediate rotatable elements mounted thereon for respectively mechanically driving said reels, refractive optical means for directing light with respect to said film, aperture means for selectively exposing transversely different longitudinal portions of said film to light directed through said refractive means depending upon the direction of movement of said film between said reels, a general mounting structure supporting said optical means in a stationary manner with respect thereto and carrying said intermediate mounting means, rotary driving means carried by said general mounting structure, movable perforation engaging means carried by said general mounting structure and driven by said rotary driving means for positively feeding said film, and a rotatable device driven by said rotary driving means for selectively imparting rotary motion to said intermediate rotatable elements, said rotatable device and said intermediate mounting structure being relatively movable whereby said rotatable device can be selectively mechanically coupled with either of said intermediate rotatable elements carried by said intermediate mounting means so that said reel elements can be selectively driven by said rotary driving means for moving said film from said first reel to said second reel past said refractive means and said aperture means to expose one longitudinal portion of said film to light passing through said refractive means or for moving said film from said second reel to said first reel for exposing another longitudinal portion of said film to light passing through said refractive means.

30. Film apparatus for reversibly feeding a film comprising, a perforated film, an optical system including refractive optical means and aperture means for cooperation with said film to expose transversely different longitudinal portions thereof to light directed through said aperture and refractive means, a general mounting structure carrying said optical means, rotary driving means carried by said general mounting structure, film perforation engaging means mounted in said general mounting structure and driven by said driving means, an intermediate mounting structure carried by said general mounting structure and provided with a pair of rotatable film take-up driving elements, and a rotatable device driven by said rotary driving means for selectively imparting rotary motion to said take-up driving elements, said rotatable device and said intermediate mounting structure being relatively movable whereby said rotatable device can be selectively mechanically coupled with either of said take-up driving elements carried by said intermediate structure for feeding said film in two different directions with reference to said take-up driving elements and past said optical system to expose transversely different longitudinal portions of said film to light passing through said optical system depending upon the direction of feed of said film.

31. A film apparatus comprising, a perforated film, refractive means for directing light with reference to a selected longitudinal half portion of said film, film advancing and exposing means including take-up elements and perforation engaging means as well as a shutter, actuating means for driving said film advancing and exposing means and including a mechanical movement having a train of reduction gears and a coiled spring coupled therewith, a rotatable member effectively actuated by said spring for transferring motion to said shutter, a mechanical arrangement including said rotatable member for effectively bringing said shutter to rest in a predetermined position with respect to said film, a rotatable device operatively coupled with said mechanical movement for imparting a driving force to said take-up elements, said device and said film take-up elements being relatively movable in a sense other than rotation for permitting selective coupling of said rotatable device with said take-up elements in a film feeding and take-up operation, and a manually settable element movable from one position to another to initiate the operation of said actuating means, said element having a mechanical interconnection with said actuating means.

GORDON BROWN SCHEIBELL.